United States Patent Office 3,393,352
Patented July 16, 1968

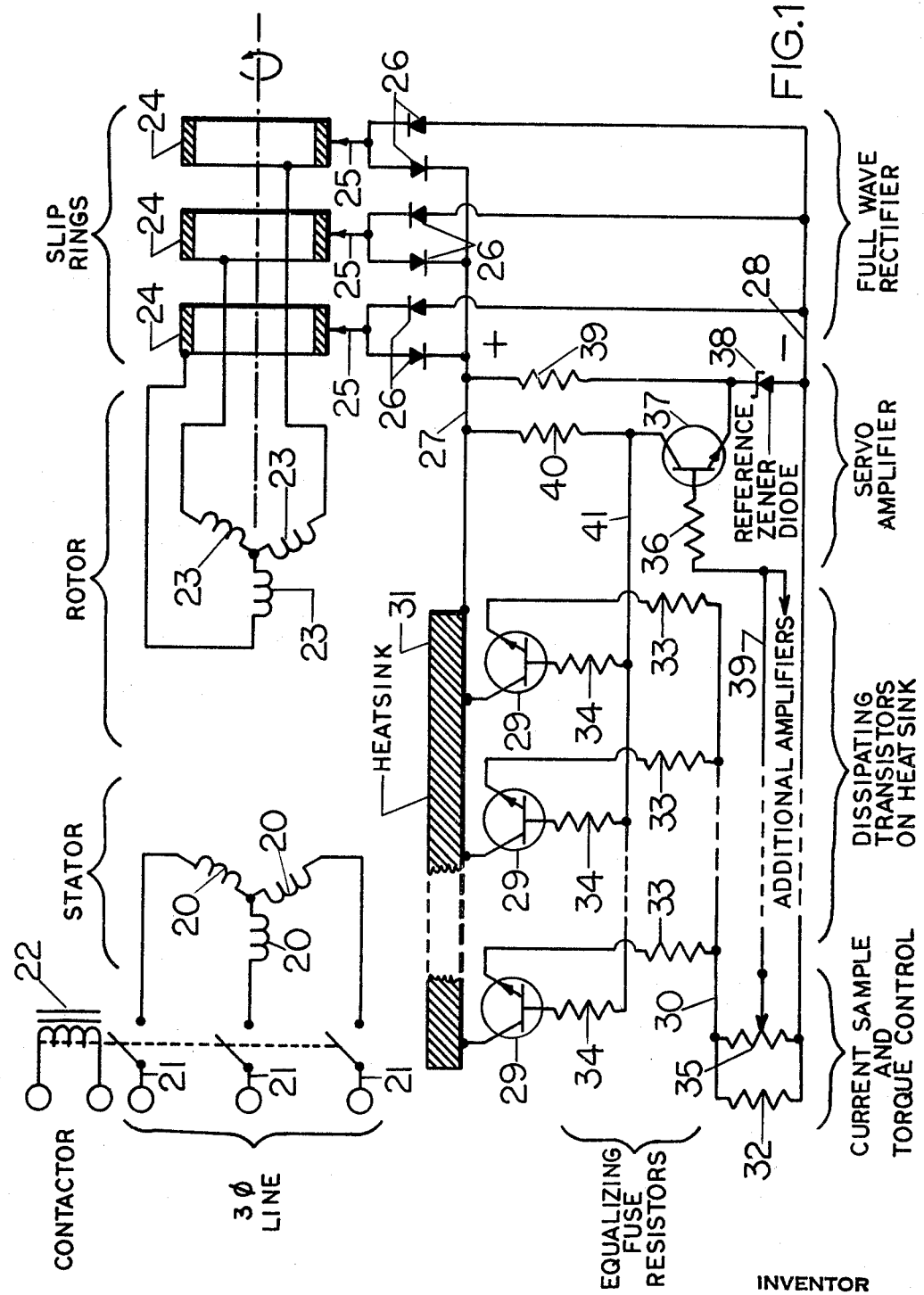

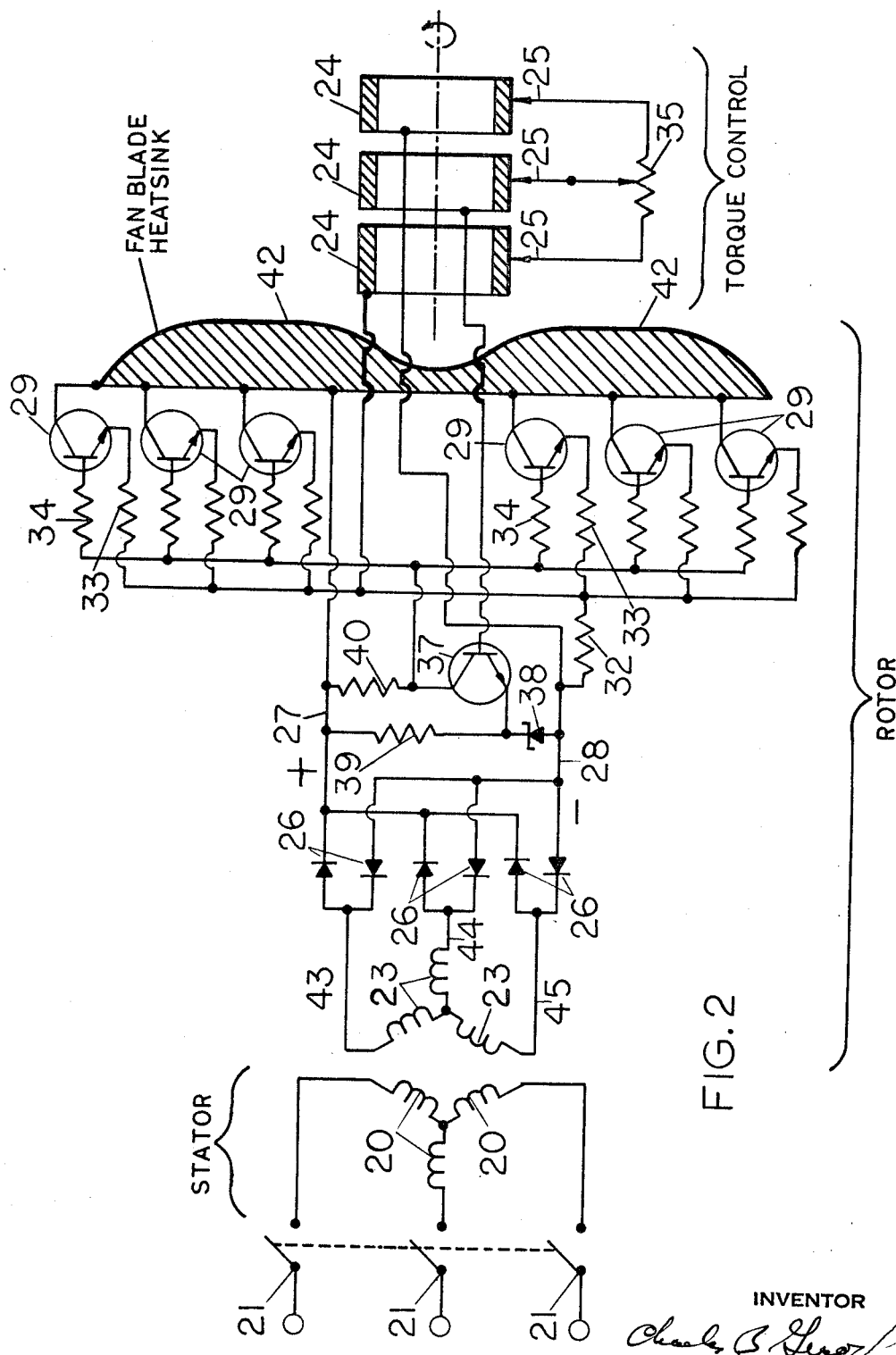

3,393,352
WOUND ROTOR POLYPHASE MOTOR CONTROL SYSTEM
Charles B. Grady, Jr., West Orange, N.J., assignor to The Metrodynamics Corporation, Red Bank, N.J., a corporation of New Jersey
Filed Jan. 27, 1966, Ser. No. 523,317
5 Claims. (Cl. 318—237)

ABSTRACT OF THE DISCLOSURE

The alternating current in the polyphase rotor windings of a wound rotor motor is rectified into pulsating direct current and impressed on the electrical load presented by a bank of parallel connected transistors, where it is dissipated as heat. This load is varied by electrical servo means acting on the bases of said transistors in response to the magnitude of the load current to control this current to a predetermined value. By mounting these load transistors on the rotor, the conventional load slip rings may be obviated.

---

This invention relates to alternating current motor control systems, and in particular to a control system for wound rotor polyphase induction or synchronous machines in which electrical polyphase power from the rotor is first converted into direct current, and is then dissipated into heat within a distributed plurality of transistors under a constant current servo control.

In the present art of wound rotor motor control, it is conventional practice to use a ladder of heat dissipating resistors for each phase. These resistors may then be connected between each of the rotor slip ring brushes by a plurality of heavy contactors which are operated in a sequence of phase groups to increase the torque, and bring the motor up to speed. Also, arcing in these contactors introduces an undesirable maintenance problem. This discontinuous control system results in a jerky performance, and requires an oversized line contactor to handle the large inrush currents which are inherent in this switching control system.

The present invention overcomes these shortcomings by providing a smooth, stepless control which is fail-safe, and so instantaneous in action as to allow the use of a normal capacity line contactor because there are no large inrush surges. In addition, this system has no moving parts or contactors, having all solid-state components. This system is self-programming in bringing the motor up to speed at any pre-set torque. Stepless torque control is thus provided up to the full capacity of the motor.

This invention provides a major economy as a heat dissipating system because the cost per watt of silicon power transistors is now less than the cost per watt of power resistors, and if the required switching gear for the resistors is considered, there is a substantial saving.

In an alternative form of the invention which is made possible by the absence of moving parts, the entire heat-dissipating transistor array is mounted on propellor fan blades which revolve integrally with the motor rotor to form a self-ventilating heat sink. This configuration of the invention makes possible a constant torque self-starting wound rotor induction motor having no slip rings whatever. Alternatively, with the use of a fractional watt control signal slip ring, full torque control of the motor is available without the cost and space requirements of high power slip rings.

The principal object of the subject invention is to provide a stepless automatic control system for wound rotor polyphase motors, which is inexpensive to fabricate and maintain.

Another object of the invention is to provide a motor control system which does not produce large inrush surges of current, and which consequently obviates the use of oversized line contactors.

Still another object of the invention is to provide a design of wound rotor polyphase motor control which dissipates the rotor power in the rotor, thereby obviating the need of power slip rings.

A further object of the invention is to provide a design of electric power dissipator for wound rotor induction motors which is less expensive than power resistors, and which, by the use of multiple shunt connected transistors, provides an efficient thermal coupling to an extended surface of heat radiator.

For other objects and a clearer understanding of the invention, reference is made to the following detailed specification to be taken in conjunction with the accompanying drawings, in which:

FIGURE 1 is a schematic diagram of the preferred form of the invention for controlling existing conventional wound rotor machines having slip ring access to the rotor windings; and FIGURE 2 is a schematic diagram of the form of the invention in which the rotor power is dissipated in a fan heat sink integrally revolving with the rotor.

Referring to FIG. 1, numeral 20 represents each of the three Y connected stator windings of a wound rotor three phase induction motor, each of which coils have access to the three phase line through contacts 21 of the line contactor magnet coil 22.

Three Y connected wound rotor coils 23 are provided and are connected to the three slip rings 24. The three corresponding brushes 25 are connected to feed a full wave rectifier bridge made up by the six rectifying diodes 26. The rectified output of the three phase rotor windings is delivered as direct current of the polarity shown on the busses 27 and 28.

When the control system is dissipating power, it does so by passing current from bus 27 through a large plurality of parallel connected transistors 29 which are physically and thermally connected at their collectors to a heat dissipating sink 31, the current thence returning to bus 28 via a current sampling resistor 32. Each transistor 29 is provided with a resistor 33 in series with its emitter, and a resistor 34 in series with its base.

Both resistors 33 and 34 are made of a fusable wire, so that these resistors serve both as a means of insuring equal distribution of the load between the transistors 29, which may have slightly different operating characteristics, and also as a protective fusing system which will allow several of the large plurality of transistors 29 to fail in a short circuiting mode without jeopardizing the continuing operation of the system. In this respect the system may be described as "fail-safe."

The current sampling potential across resistor 32 is impressed on a variable potentiometer 35, so that a selected portion thereof is taken off by the arm of potentiometer 35 to be applied via lead 39 through limiting resistor 36 to the base of a transistor 37 as the error signal of a servo amplifier loop.

This amplifier uses the constant potential appearing across a Zener diode 38 as a reference potential to which the error signal on lead 39 can be compared. Diode 38 is fed by a resistor 39, and transistor 37 is provided with a load resistor 40, both of which return to the positive bus 27.

When the current in resistors 32 and 35 increases, the potential on lead 39 becomes more positive, and when this potential exceeds the Zener potential of diode 38, it causes transistor 37 to conduct. Since the bases of all the power dissipating transistors 29 are biassed via bus 41 by the potential across load resistor 40, the flow of current in load resistor 40 also cuts off all the power transistors 29.

Conversely, if the current in sampling resistor 32 decreases below the set value as determined by the setting of potentiometer 35, transistor 37 will cease conducting through load resistor 40, thereby causing transistors 29 to conduct by the consequent raising of the base potential of bus 41.

This system is therefore an automatic constant current electrical load for the electric power generated in wound rotor coils 23, which is the ideal condition for automatic stepless starting. The setting of potentiometer 35 will determine the torque delivered by the motor, and if the motor's mechanical load exceeds the selected torque it will simply stall without damage to the system.

Evidently, although transistors 29 and 37 have been shown as NPN types, the system could be designed for PNP type operation within the scope of the invention.

One of the features of this invention is the use of a large number of relatively small transistors so as to allow a favorable ratio of heat dissipation area to transistor junction area, and also to provide the fail-safe characteristic.

For example, in a machine in which the wound rotor is required to dissipate 10 kw., the system might use 100 transistors each capable of dissipating 100 watts. Since each servo amplifier transistor 37 can drive approximately 10 power transistors, this would require 10 such transistors 37, each driving its group of dissipating transistors 29.

Evidently, multiple stage amplifiers may be used instead of the single stage shown.

Referring now to the arrangement of FIG. 2, it may be seen that electrically, the circuit of FIG. 2 is identical to that of FIG. 1, and that the function and labeling of the corresponding parts is the same.

However, mechanically, the system of FIG. 2 is very different because all of the components with the exception of control potentiometer 35 and brushes 25 are bodily mounted in and on the rotor. A convenient way of doing this is to use wound rotor with a hollow shaft through which conductors 43, 44, and 45 can pass, thus allowing the package containing the remaining components and the slip rings 24 to be secured to this hollow shaft outboard to one of the motor bearings.

The system of FIG. 2 is provided with a plurality of metal air propellors or fan blades 42 to which the power dissipating transistors 29 are mechanically and thermally bonded. In this way the electric power from windings 23 is converted into heat and transferred to the air without requiring transfer through slip rings. For this reason, the slip rings 24' and brushes 25' may here be miniaturized to a capacity of a fraction of a watt, since they are required only to carry the error signal.

What is claimed is:

1. An electric polyphase motor control system comprising:
   a polyphase stator;
   means to excite said stator;
   a wound polyphase rotor;
   a full wave rectifier connected to the windings of said rotor for converting the polyphase output of said windings into direct current;
   a plurality of transistors connected in parallel relation to one another, and connected in series relation to the direct current output of said rectifier; and
   servo means operative on the bases of said transistors and responsive to the magnitude of said current to control said current to a predetermined constant value.

2. In a control system according to claim 1:
   a fan blade secured to said rotor, said transistors being secured to and in thermal communication with said fan blade.

3. In a control system according to claim 1:
   a fusable wire connected in series with each said transistor.

4. A motor control system comprising:
   a polyphase stator;
   means to excite said stator;
   a wound polyphase rotor;
   means to rectify the polyphase output of said rotor into direct current;
   a variable electrical load consisting of a plurality of transistors connected in parallel relation, and connected to the output of said rectifying means to convert said current into heat;
   means to conduct said heat away from said load; and
   control means responsive to the value of said direct current to adjust the value of said transistor load to maintain a predetermined load current, said control means comprising a resistor for sampling said current, a source of constant reference potential, and amplifier means to impress the amplified difference between a selected fraction of the potential across said sampling resistor and said reference potential on the bases of said transistors.

5. In a control system in accordance with claim 4:
   a plurality of fan blades secured to said wound rotor, said transistors being secured to and in thermal communication with said fan blades.

References Cited

UNITED STATES PATENTS

| | | | |
|---|---|---|---|
| 2,835,859 | 5/1958 | Burns | 318—238 X |
| 3,017,554 | 1/1962 | Fischer | 318—239 |
| 3,082,364 | 3/1963 | Fischer et al. | 318—239 |
| 3,231,805 | 1/1966 | Shibata | 318—238 |
| 3,327,189 | 6/1967 | Hedstrom | 318—237 H |

ORIS L. RADER, *Primary Examiner.*

G. Z. RUBINSON, *Assistant Examiner.*